(12) United States Patent
Chen

(10) Patent No.: US 12,084,147 B2
(45) Date of Patent: Sep. 10, 2024

(54) ELECTRIC ASSISTED BICYCLE AND HUB MOTOR THEREOF

(71) Applicant: LINGBEI MOTOR TECHNOLOGY (SHANGHAI) CO., LTD., Shanghai (CN)

(72) Inventor: Rex Chen, Shanghai (CN)

( * ) Notice: Subject to any disclaimer, the term of this patent is extended or adjusted under 35 U.S.C. 154(b) by 282 days.

(21) Appl. No.: 17/707,952

(22) Filed: Mar. 30, 2022

(65) Prior Publication Data

US 2023/0024959 A1    Jan. 26, 2023

(30) Foreign Application Priority Data

Jul. 26, 2021    (CN) .......................... 202110855080.9

(51) Int. Cl.
| | |
|---|---|
| B62M 11/14 | (2006.01) |
| B62K 11/00 | (2006.01) |
| B62M 6/60 | (2010.01) |
| H02K 7/02 | (2006.01) |
| H02K 7/108 | (2006.01) |
| H02K 7/116 | (2006.01) |

(52) U.S. Cl.
CPC .............. *B62M 6/60* (2013.01); *B62K 11/00* (2013.01); *B62M 11/14* (2013.01); *H02K 7/02* (2013.01); *H02K 7/108* (2013.01); *H02K 7/116* (2013.01)

(58) Field of Classification Search
CPC ........ B62M 6/60; B62M 11/14; B62M 11/16; B62M 6/65; B62M 1/10; B62M 7/12; H02K 7/02; H02K 7/108; H02K 7/116; B60K 2007/0038; B60K 2007/0092; B60K 7/00; B60K 7/0007; B60K 17/02; B60K 17/046; B60Y 2200/13; B60B 27/0047; B60B 29/008
See application file for complete search history.

(56) References Cited

U.S. PATENT DOCUMENTS

| | | | | |
|---|---|---|---|---|
| 2011/0259658 | A1* | 10/2011 | Huang ................. | B60K 7/0007 180/65.51 |
| 2013/0015009 | A1* | 1/2013 | Lin ........................ | B62K 25/02 280/281.1 |
| 2013/0241175 | A1* | 9/2013 | Talavasek ................ | B62M 6/60 280/288.4 |
| 2014/0327227 | A1* | 11/2014 | Barefoot ................ | B62K 25/02 280/281.1 |
| 2018/0001957 | A1* | 1/2018 | Chang ................. | B60B 27/0047 |

FOREIGN PATENT DOCUMENTS

| | | | |
|---|---|---|---|
| CN | 209375366 U | * 9/2019 | |
| DE | 202012102545 U1 | * 10/2012 | ........... B60B 27/023 |

OTHER PUBLICATIONS

CN209375366U English translation (Year: 2024).*
DE202012102545U1 English translation (Year: 2024).*

* cited by examiner

*Primary Examiner* — Terrance L Kenerly
*Assistant Examiner* — Viswanathan Subramanian
(74) *Attorney, Agent, or Firm* — Bruce Stone LLP; Joseph A. Bruce

(57) ABSTRACT

A hub motor is disclosed, the hub motor is mounted on an axle assembly, the an axle assembly includes an axle rod and an axle sleeve, and an independent cassette flywheel is provided at one end of the axle sleeve where an end cover is located, a limiting sleeve is disposed outside of the cassette flywheel to prevent the cassette flywheel from detaching from the axle sleeve, and an anti-rotation piece for preventing rotation of the axle sleeve is provided at another end of the axle sleeve where a wheel hub is located.

6 Claims, 8 Drawing Sheets

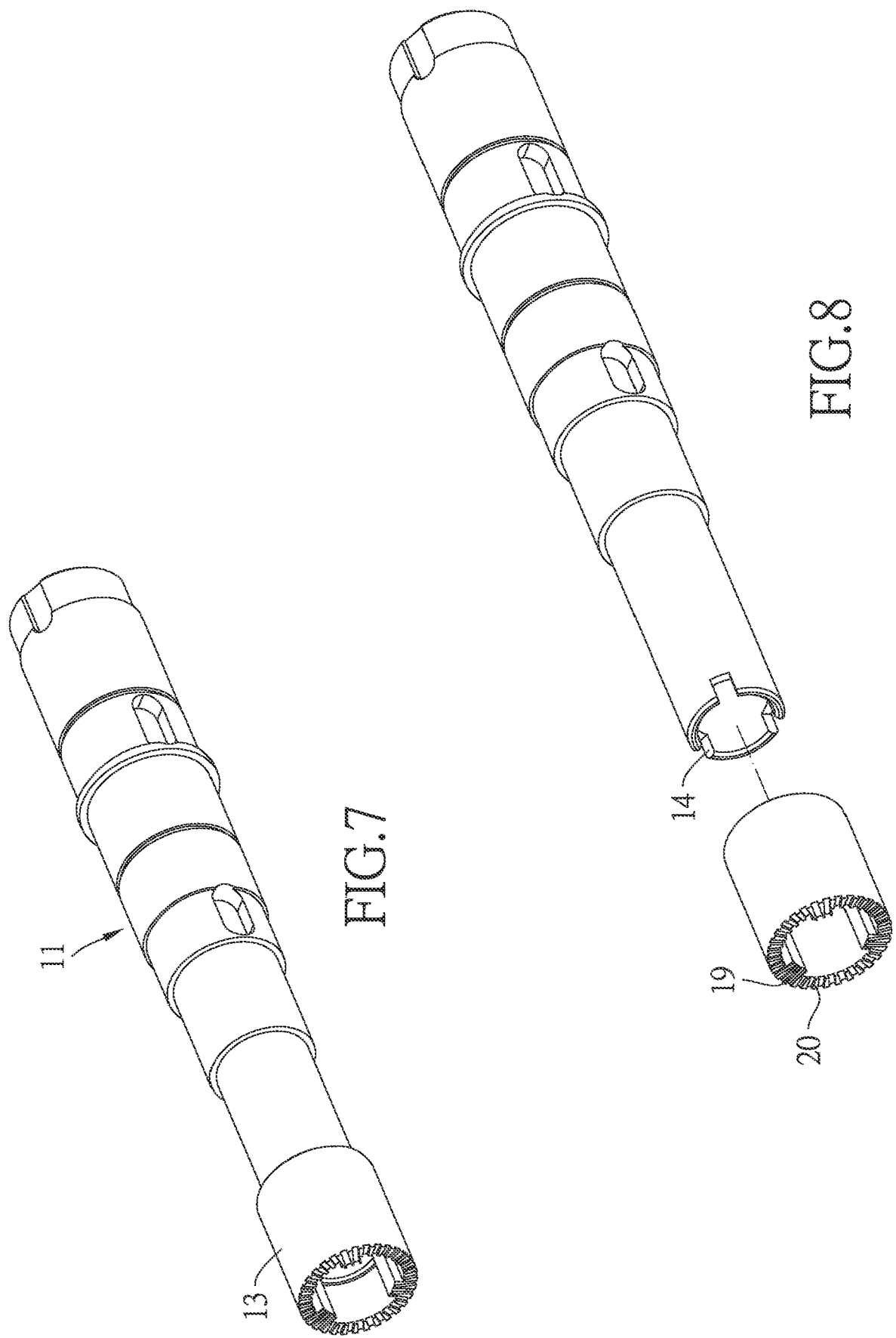

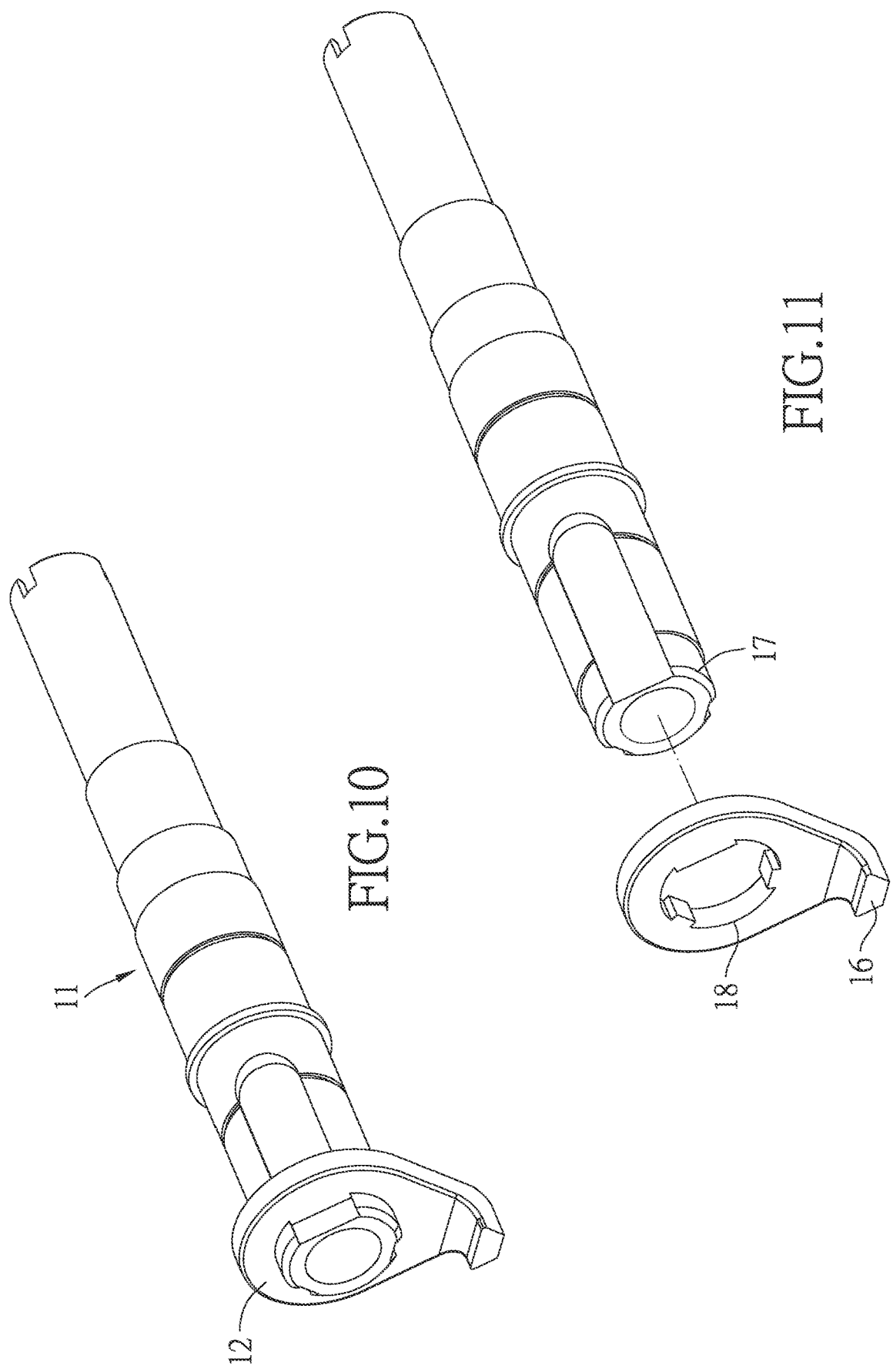

ELECTRIC ASSISTED BICYCLE AND HUB MOTOR THEREOF

BACKGROUND

Field of the Invention

The present invention relates to an electric assisted bicycle, and more particularly to a hub motor for the electric assisted bicycle.

Description of Related Art

There are many ways to configure the power system of electric-assisted bicycles. One of them is to set the motors at the hubs of the front and rear wheels to provide assistance power to the bicycle when needed. The advantage of this kind of electric-assisted bicycle is that its assisting force acts directly on the wheels, which has high efficiency and compact structure. However, in the event of a tire blowout and other failures during riding on a bicycle with hub motors installed, special tools are generally required to disassemble the wheels from the bicycle, which is inconvenient for maintenance.

SUMMARY

In view of the above-mentioned defects of the prior art, the technical problem to be solved by the present invention is to provide a hub motor that is easy to assemble and disassemble for an electric assisted bicycle.

To achieve the above objective, the present invention provides a hub motor, the hub motor is mounted on an axle assembly, the an axle assembly includes an axle rod and an axle sleeve, and an independent cassette flywheel is provided at one end of the axle sleeve where an end cover is located, a limiting sleeve is disposed outside of the cassette flywheel to prevent the cassette flywheel from detaching from the axle sleeve, and an anti-rotation piece for preventing rotation of the axle sleeve is provided at another end of the axle sleeve where a wheel hub is located.

Preferably, a drive device, a deceleration device and a transmission device are disposed in an end cover and a wheel hub of the hub motor, the drive device includes a motor rotor and a motor stator, the deceleration device includes a double gear and a sun gear, and the transmission device includes a ring gear and a planetary clutch.

Preferably, the limiting sleeve includes keys formed on an inner surface of the limiting sleeve for engaging with key grooves formed at the end of the axle sleeve.

Preferably, a knurling pattern for preventing rotation of the axle sleeve is provided on an end surface of the limiting sleeve.

Preferably, the anti-rotation piece includes a locking hole and an anti-rotation head, the anti-rotation piece is fixed on the axle sleeve through the cooperation of the locking hole and a locking groove provided on the axle sleeve, the anti-rotation head is configured to cooperate with fork ends of a front fork or a rear fork of a bicycle to prevent the rotation of the axle sleeve.

Preferably, the axle rod is provided with a handle.

The present invention provides an electric assisted bicycle, the hub motor as mentioned above is disposed between fork ends of a front fork of the electric assisted bicycle, and the fork ends are fixed between the axle rod and the axle sleeve.

The present invention provides an electric assisted bicycle, the hub motor as mentioned above is disposed between fork ends of a rear fork of the electric assisted bicycle, and the fork ends are fixed between the axle rod and the axle sleeve.

When the electric-assisted bicycle according to the present invention needs to be repaired, turn the handle to loosen the axle rod from a tightening nut, and pull out the axle rod from the axle sleeve, the entire wheel can be disassembled from the bicycle, or remove the limiting sleeve so that the cassette flywheel can be taken out from the axle sleeve, thereby facilitating maintenance or parts replacement.

BRIEF DESCRIPTION OF THE DRAWINGS

After studying the detailed description in conjunction with the following drawings, other aspects and advantages of the present invention will be discovered:

FIG. 7 is an assembly view of the limiting sleeve and the axle sleeve in a preferred embodiment of the present invention;

FIG. 8 is the assembly view of the limiting sleeve and the axle sleeve in a preferred embodiment of the present invention;

FIG. 10 is the assembly view of the anti-rotation piece and the axle sleeve in a preferred embodiment of the present invention;

FIG. 11 is the assembly view of the anti-rotation piece and the axle sleeve in a preferred embodiment of the present invention.

DETAILED DESCRIPTION

The following describes several preferred embodiments of the present invention with reference to the drawings, so as to make its technical content clearer and easier to understand. The present invention can be embodied in many different forms of embodiments, and the protection scope of the present invention is not limited to the embodiments mentioned herein.

Figure 1:
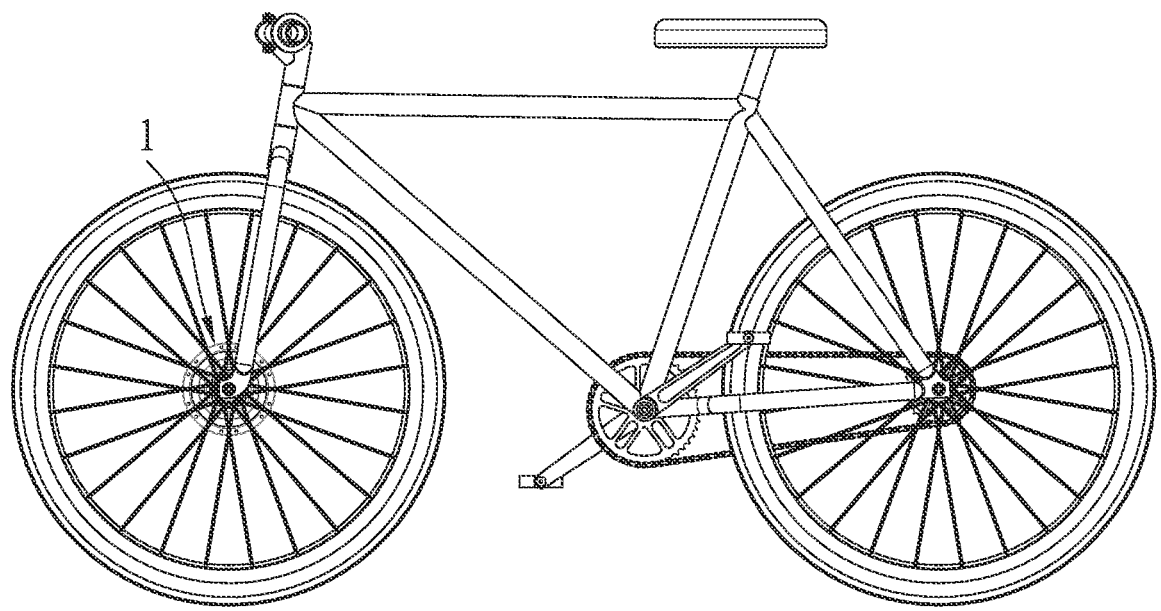
FIG. 1 is an illustrative view of an electric assisted bicycle in a preferred embodiment of the present invention.

An electric power-assisted bicycle according to the present invention is shown in FIG. 1, wherein a hub motor 1 is disposed to the front wheel hub of the bicycle.

Figure 2:
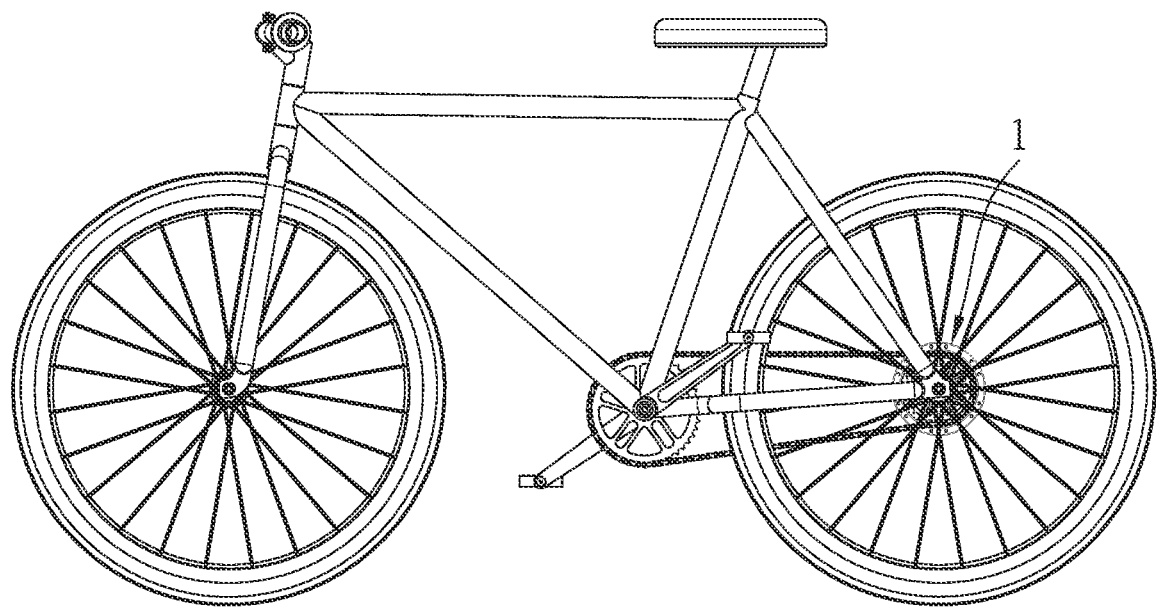
FIG. 2 is an illustrative view of the electric assisted bicycle in another preferred embodiment of the present invention.

Another electric-assisted bicycle according to the present invention is shown in FIG. 2, wherein the hub motor 1 is disposed to the rear wheel hub of the bicycle.

Figure 3:
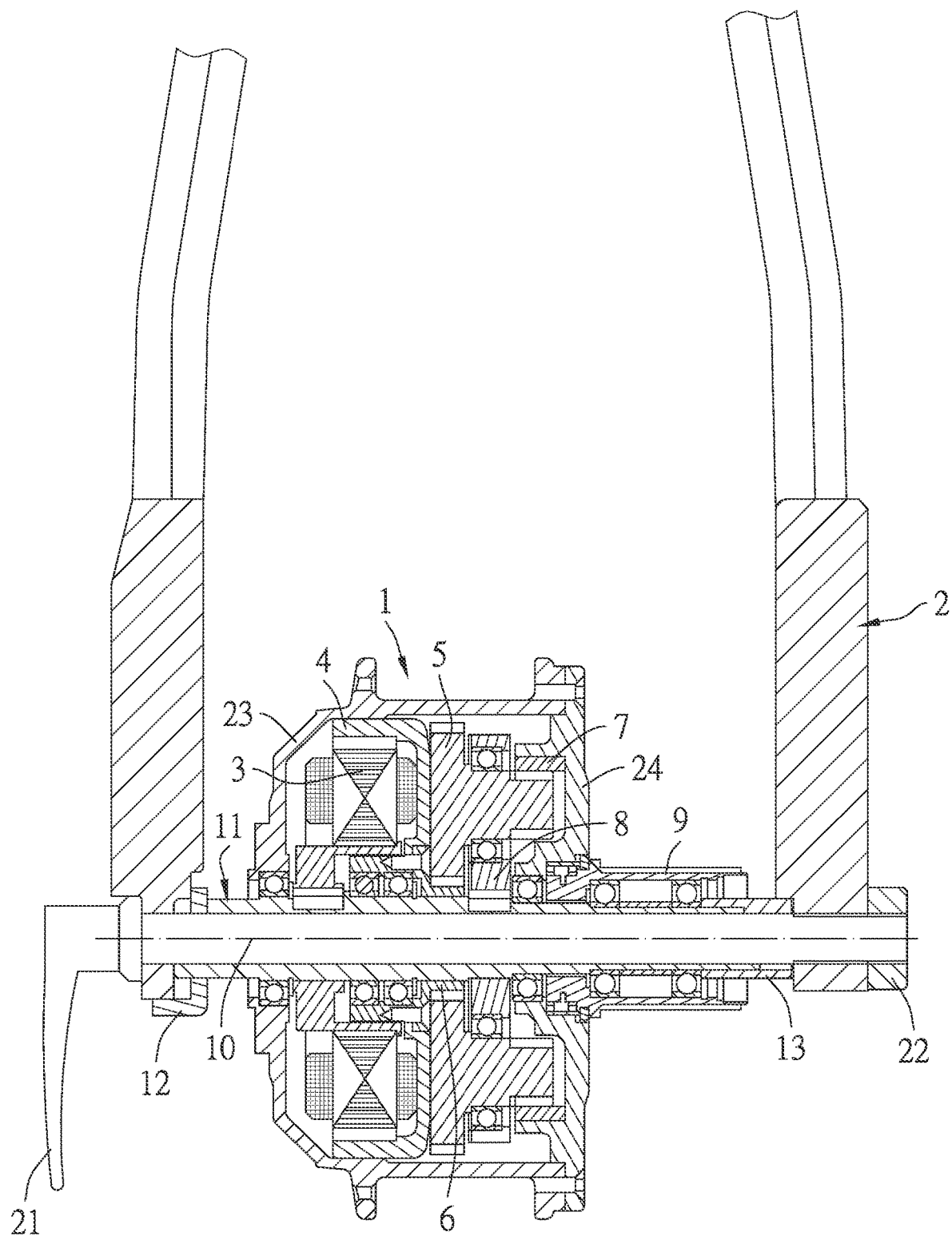
FIG. 3 is a cross-sectional view of the hub motor after installation in a preferred embodiment of the present invention.
Figure 4:
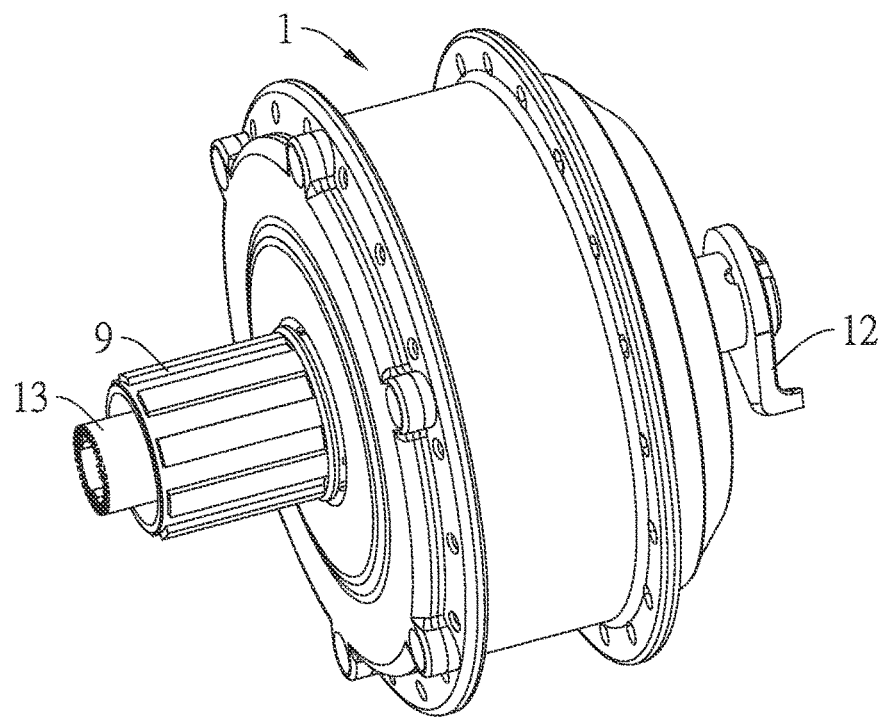
FIG. 4 is a perspective view of the end cover side of the hub motor in a preferred embodiment of the present invention.
Figure 5:
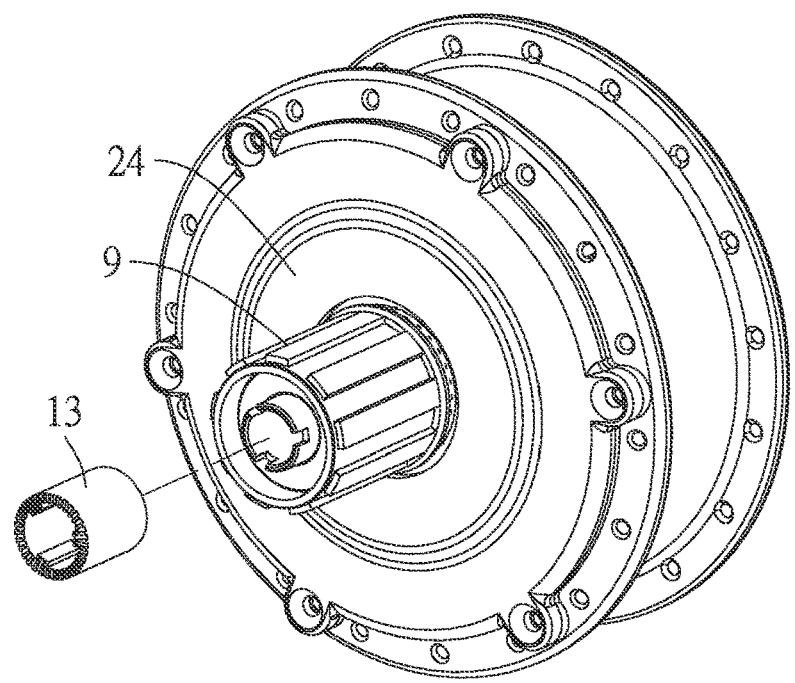
FIG. 5 is an illustrative view of the installation of the limiting sleeve in a preferred embodiment of the present invention.
Figure 6:
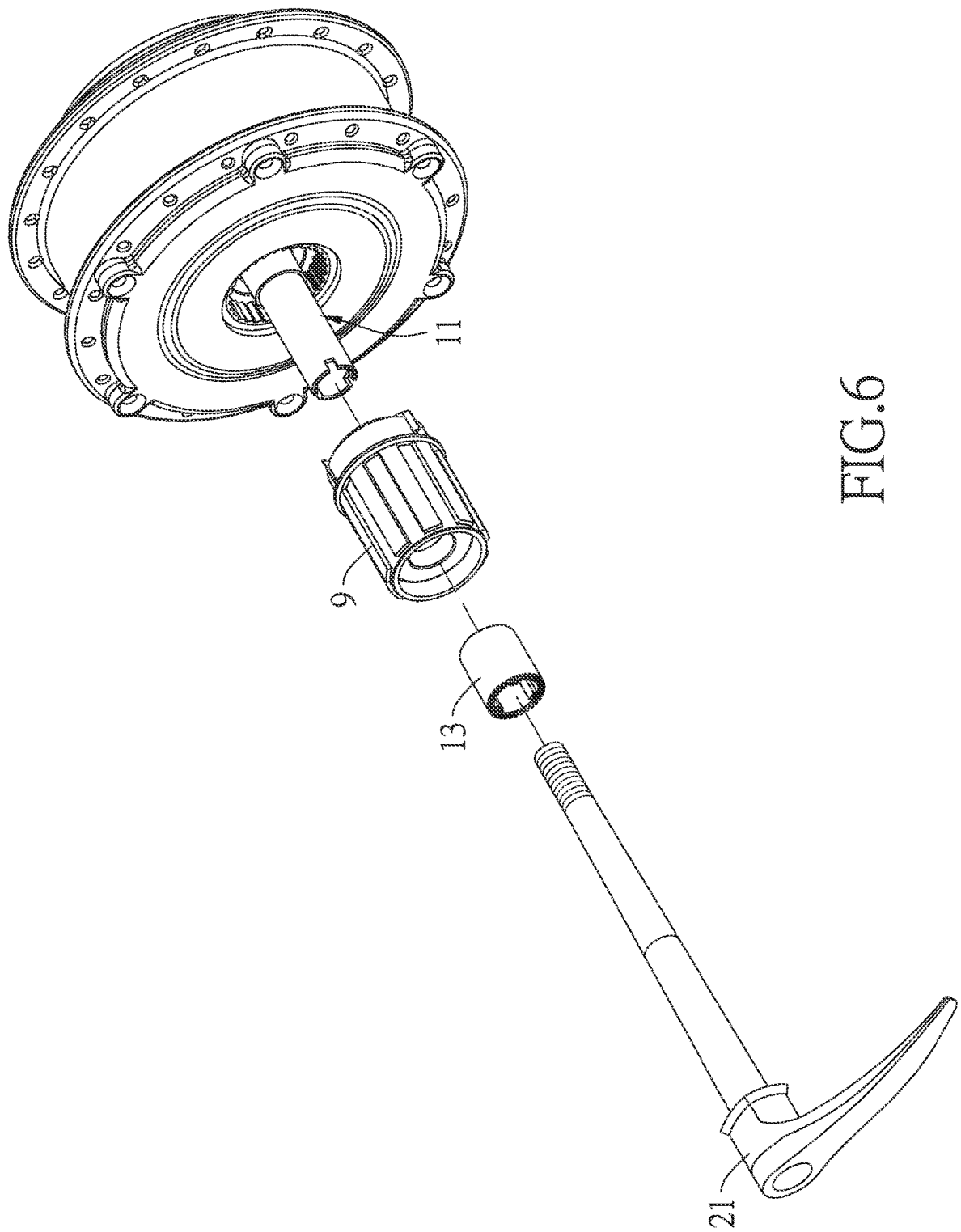
FIG. 6 is an exploded view of the end cover side of the hub motor in a preferred embodiment of the present invention.
Figure 9:
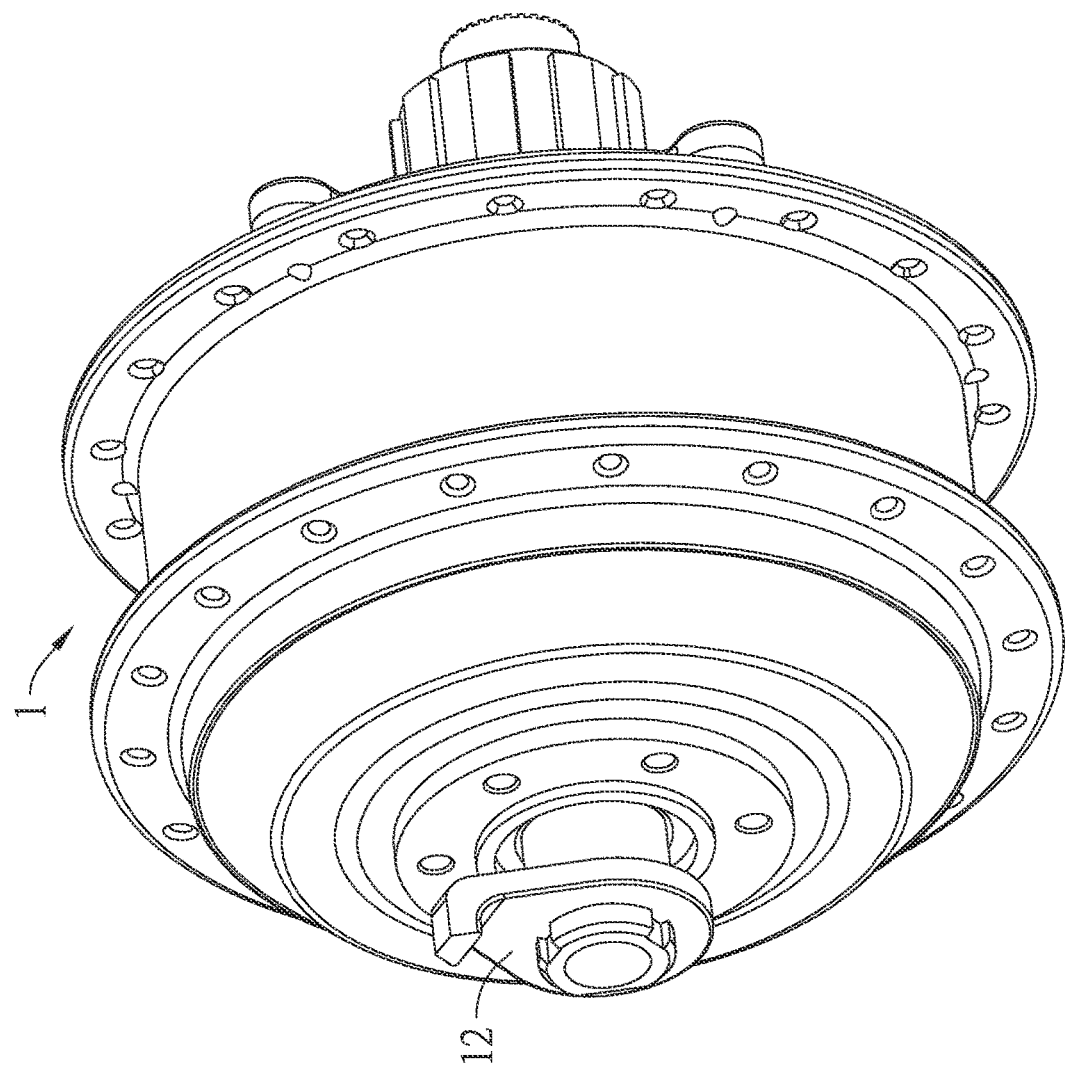
FIG. 9 is an assembly view of the hub side of the hub motor in a preferred embodiment of the present invention.

FIG. 3 is a cross-sectional view of the hub motor 1 according to the present invention after installation. A drive device, a deceleration device and a transmission device are disposed in an end cover 24 and a wheel hub 23 of the hub motor 1. In this embodiment, the drive device includes a motor rotor 3 and a motor stator 4; the deceleration device includes a double gear 5 and a sun gear 6; the transmission device includes a ring gear 7 and a planetary clutch 8. For those skilled in the art, it is obvious to replace the above-mentioned drive device, deceleration device and transmission device with other technical means in the prior art, and the present invention does not intend to limit this, so various modifications and alternations should fall within the protection scope of the present invention. The hub motor 1 is rotatably disposed on an axle assembly including an axle rod 10 and an axle sleeve 11, wherein the axle rod 10 with a handle 21 is inserted through the axle sleeve 11. Both fork ends 2 of the front fork or the rear fork of the bicycle are fixed between the axle rod 10 and the axle sleeve 11. One end of the axle rod 10 where the end cover 24 is located is provided with a thread, and the handle 21 is provided at the other end of the axle rod 10 where the wheel hub 23 is located.

Referring to FIGS. 3-8, an independent cassette flywheel 9 is provided on a part of the axle sleeve 11 at one side of the hub motor 1. The so-called independent means that unlike the prior art in which the cassette is fixed on or inside the end cover of the hub motor, the cassette flywheel 9 according to the embodiment of the present invention is arranged outside the end cover 24 and is independent of the end cover 24 so that it can be quickly disassembled without removing the end cover. In order to limit the axial disengagement of the cassette flywheel 9, a limiting sleeve 13 is provided on the axle sleeve 11 and outside the cassette flywheel 9. The limiting sleeve 13 includes keys 19 formed on an inner surface of the limiting sleeve 13 and engaged with key grooves 14 formed at the end of the axle sleeve 11. It can be seen that this end of the axle sleeve 11 is actually fastened to the fork end 2 through the limiting sleeve 13. In order to further fix the axle sleeve 11 and prevent the axle sleeve 11 from rotating relative to the fork end 2, a knurling pattern 20 is provided on the end surface of the limiting sleeve 13 in contact with the fork end 2.

Figure 12:
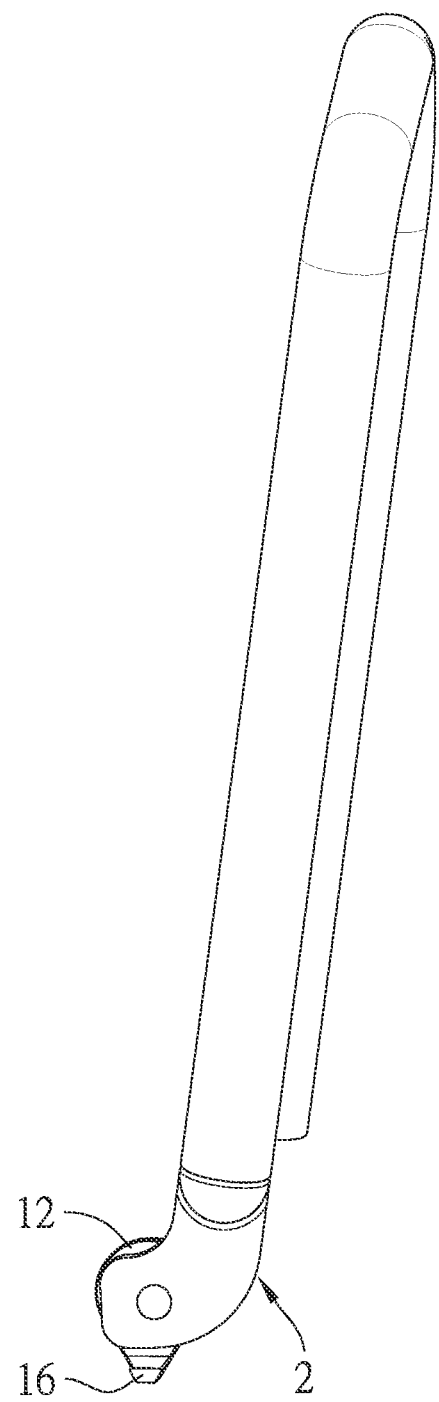
FIG. 12 is an illustrative view of the cooperation of the anti-rotation piece and the fork ends in a preferred embodiment of the present invention.

Referring to FIG. 3 and FIGS. 9-11 at the same time, on the other side of the hub motor 1, the axle sleeve 11 is provided with an anti-rotation piece 12 to prevent the axle sleeve 11 from rotating relative to the fork end 2. The anti-rotation piece 12 is provided with a locking hole 18 and an anti-rotation head 16. The anti-rotation piece 12 is fixed on the axle sleeve 11 through the cooperation of the locking hole 18 and a locking groove 17 provided on the axle sleeve 11. As shown in FIG. 12, when the hub motor 1 is installed on the bicycle, the anti-rotation head 16 of the anti-rotation piece 12 plays the role of preventing the rotation of the axle sleeve 11 by cooperating with the fork end 2 of the bicycle. In this embodiment, the anti-rotation head 16 is formed by bending a tip of the anti-rotation piece 12.

When the electric-assisted bicycle according to the present invention as shown in FIGS. 1 and 2 needs to be repaired, refer to FIGS. 3, turn the handle 21 to loosen the axle rod 10 from a tightening nut 22, and pull out the axle rod 10 from the axle sleeve 11, the entire wheel can be disassembled from the bicycle, or remove the limiting sleeve 13 so that the cassette flywheel 9 can be taken out from the axle sleeve 11, thereby facilitating maintenance or parts replacement.

The preferred embodiments of the present invention have been described in detail above. It should be understood that those skilled in the art can make many modifications and changes according to the concept of the present invention without creative efforts. Therefore, any technical solutions that can be obtained by a person with ordinary skill in the art through logical analysis, reasoning or limited experiments on the basis of the prior art according to the concept of the present invention shall fall within the protection scope determined by the claims of the invention.

What is claimed is:

1. A hub motor being mounted on an axle assembly, the axle assembly including an axle rod and an axle sleeve, and an independent cassette flywheel being provided at one end of the axle sleeve where an end cover is located, a limiting sleeve being disposed outside of the cassette flywheel to prevent the cassette flywheel from detaching from the axle sleeve, and an anti-rotation piece for preventing rotation of the axle sleeve being provided at another end of the axle sleeve where a wheel hub is located;

wherein a knurling pattern for preventing rotation of the axle sleeve is provided on an end surface of the limiting sleeve, the anti-rotation piece includes a locking hole and an anti-rotation head, the anti-rotation piece is fixed on the axle sleeve through the cooperation of the locking hole and a locking groove provided on the axle sleeve, the anti-rotation head is configured to cooperate with fork ends of a front fork or a rear fork of a bicycle to prevent the rotation of the axle sleeve.

2. The hub motor as claimed in claim 1, wherein a drive device, a deceleration device and a transmission device are disposed in an end cover and a wheel hub of the hub motor, the drive device includes a motor rotor and a motor stator, the deceleration device includes a double gear and a sun gear, and the transmission device includes a ring gear and a planetary clutch.

3. The hub motor as claimed in claim 1, wherein the limiting sleeve includes keys formed on an inner surface of the limiting sleeve for engaging with key grooves formed at the end of the axle sleeve.

4. The hub motor as claimed in claim 1, wherein one end of the axle rod where the end cover is located is provided with a thread, and a handle is provided at another end of the axle rod where the wheel hub is located.

5. An electric assisted bicycle using the hub motor as claimed in claim 1, characterized in that, the hub motor is disposed between fork ends of a front fork of the electric assisted bicycle, and the fork ends are fixed between the axle rod and the axle sleeve.

6. An electric assisted bicycle using the hub motor as claimed in claim 1, characterized in that, the hub motor is disposed between fork ends of a rear fork of the electric assisted bicycle, and the fork ends are fixed between the axle rod and the axle sleeve.

* * * * *